United States Patent [19]

Wanjek et al.

[11] Patent Number: 5,128,307
[45] Date of Patent: Jul. 7, 1992

[54] COPPER-CONTAINING CATALYST FOR LOW TEMPERATURE SHIFT CONVERSION

[75] Inventors: Herbert Wanjek, Ludwigshafen; Claus Witte, Bad Duerkhein; Michael J. Sprague, Mannheim; Matthias Irgang, Heidelberg; Wolfgang Hoelderich; Wolf D. Mross, both of Frankenthal, all of Fed. Rep. of Germany

[73] Assignee: BASF Akteingesellschaft, Ludwigshafen, Fed. Rep. of Germany

[21] Appl. No.: 649,299

[22] Filed: Jan. 30, 1991

Related U.S. Application Data

[63] Continuation of Ser. No. 422,458, Oct. 17, 1989, abandoned.

[30] Foreign Application Priority Data

Nov. 3, 1988 [DE] Fed. Rep. of Germany ....... 3837308

[51] Int. Cl.$^5$ .......................... B01J 23/04; B01J 23/06
[52] U.S. Cl. ................................. 502/342; 502/343; 502/344; 502/346
[58] Field of Search ............... 502/341, 342, 346, 344, 502/343, 345

[56] References Cited

U.S. PATENT DOCUMENTS

| | | | |
|---|---|---|---|
| 4,111,847 | 9/1978 | Stiles | 502/342 |
| 4,308,176 | 12/1981 | Kristiansen | 502/346 |
| 4,436,833 | 3/1984 | Broecker et al. | 502/342 |
| 4,451,580 | 5/1984 | Butler et al. | 502/332 |
| 4,483,943 | 11/1984 | Windawi et al. | 502/342 |
| 4,547,482 | 10/1988 | Osugi et al. | 502/343 |
| 4,598,061 | 7/1986 | Scimeoder | 502/303 |
| 4,659,742 | 4/1987 | Courty et al. | 502/331 |
| 4,666,945 | 5/1987 | Osugi et al. | 502/208 |
| 4,681,868 | 7/1987 | Budge et al. | 502/184 |
| 4,806,515 | 2/1989 | Osugi et al. | 502/202 |

FOREIGN PATENT DOCUMENTS

| | | | |
|---|---|---|---|
| 3005551 | 8/1981 | Fed. Rep. of Germany | 502/342 |
| 1131631 | 10/1968 | United Kingdom | 502/342 |
| 2087855 | 6/1982 | United Kingdom | 502/342 |

OTHER PUBLICATIONS

C.A. vol. 106: 69632g, 1987, pp. 145-146.

Primary Examiner—Anthony McFarlane
Attorney, Agent, or Firm—Keil & Weinkauf

[57] ABSTRACT

Copper-containing catalysts for low temperature shift conversion at from 150° to 300° C. and under from 10 to 40 bar, which additionally contain aluminum and zinc, if necessary in the form of the compounds or oxides and are prepared by coprecipitation, the copper-containing catalysts containing potassium and having a BET surface area adapted to the potassium content, and the potassium content being brought to 0.1–3.0% by weight at a BET surface of from 30 to 160 m$^2$/g, are used for the preparation of hydrogen and carbon dioxide from carbon monoxide and water.

6 Claims, No Drawings

COPPER-CONTAINING CATALYST FOR LOW TEMPERATURE SHIFT CONVERSION

This application is a continuation of application Ser. No. 07/422,458, filed on Oct. 17, 1989, now abandoned.

The present invention relates to copper-containing catalysts for the conversion of carbon monoxide and water into carbon dioxide and hydrogen at low temperatures, and processes for the preparation of these catalysts and the use of these catalysts of the preparation of hydrogen and carbon dioxide from carbon monoxide and water.

The reaction is carried out in industry as a single-stage or multistage process, in general catalysts containing iron oxide being used above 300° C. (high temperature shift conversion) and copper-containing catalysts being used at from 150° to 300° C. (low temperature shift conversion).

Such low temperature catalysts generally consist of copper or copper compounds in combination with compounds of other element, preferably aluminum and zinc. The elements are preferably used in the form of the hydroxides, the oxides or the carbonates. Typical compositions of such catalysts are disclosed in, for example, GB-A-2 087 855.

In shift conversion, the composition of the gas emerging from the reactor is determined by the equilibrium which is established. Since the equilibrium of the reaction shifts toward the starting compounds with increasing temperature, and high residual concentrations in the exit gas lead to lower yields, the catalysts used must have high catalytic activity at low temperature.

There are many known methods for the preparation of catalysts having these properties. In one process, the copper, aluminum and zinc components are precipitated together and the precipitated product is further processed to give the catalyst. For example, GB-A-1 131 631 proposes combining a solution of sodium carbonate with a solution of copper nitrate, zinc nitrate and aluminum nitrate and subjecting the resulting precipitate, consisting of aluminum oxide hydroxide and mixed hydroxide carbonates of copper and zinc to a heat treatment at 300° C. and then pelletizing the product.

In another known process, the copper and the aluminum components are first precipitated, followed by the zinc component of the catalyst. For example, U.S. Pat. No. 4,308,176 discloses that a precipitate can be produced from an aqueous solution of copper nitrate and aluminum nitrate by adding ammonium carbonate. The precipitate is filtered off, washed, calcined at fairly high temperatures, impregnated with an aqueous zinc salt solution and then subjected to a further heat treatment to decompose the zinc salt into zinc oxide.

Copper-containing catalysts have the disadvantage that they form alcohols, in particular methanol, in a secondary reaction. If the gases to be converted also contain ammonia, amines, such as mono-, di- and trimethylamine, are formed from the ammonia. The formation of byproducts is more pronounced the more active the catalysts, the higher the reactor temperatures and the lower the steam content of the shift conversion gas. When highly active catalysts are used and low steam contents are employed in order to save energy, the problems arising through increased formation of byproducts become more serious, and there has therefore been considerable interest in reducing the formation of methanol and of amines.

The known catalysts are unsatisfactory with regard to activity, selectivity and life.

It has also been suggested (EP-A-205 130) that the undesirable formation of methanol over low temperature shift conversion catalysts prepared by precipitating a mixed solution consisting of copper nitrate, zinc nitrate and aluminum nitrate with sodium carbonate can be reduced by doping with alkali metal compounds and in particular cesium compounds and potassium compounds.

We have found that the formation of methanol and amines can be suppressed to a particularly great extent or avoided if, for low temperature shift conversion at from 150° to 300° C. and under from 10 to 40 bar, copper-containing catalysts which additionally contain aluminum and zinc, if necessary in the form of the compounds or oxides, and are prepared by coprecipitation are used, the said catalysts contain potassium and have a BET surface area adapted to the potassium content, the potassium content being brought to 0.1-3.0% by weight at a BET surface area of from 30 to 160 m$^2$/g.

These catalysts are advantageously prepared by coprecipitation of the sparingly soluble or insoluble compounds of copper, zinc and aluminum, the pH being kept constant and the precipitation temperature being kept constant at from 30° to 90° C. during the precipitation and, after aging of the precipitate in the weakly acidic range and filtration, the required amount of a potassium compound is added to the filter cake, the mixture is suspended in H$_2$O for homogeneous distribution of the potassium compound, the suspension is dried and the product is processed in a known manner, a BET surface area of from 30 to 160 m$^2$/g being obtained by maintaining pH of from 5.5 to 8.0 during the precipitation.

Surprisingly, we have found that amine formation over the novel low temperature shift conversion catalysts which are doped with a controlled amount of potassium and in which the BET surface area is adapted to this potassium content can be substantially reduced without adversely affecting the activity. For example, by reducing the BET surface area and keeping the K content constant, amine formation can be reduced and the selectivity improved, ie. to reduce amine formation to the same level a comparatively larger amount K$_2$O is required with a larger BET surface area than with a smaller surface area. It is also possible to suppress methanol formation over these catalysts.

Substantial effects in suppressing the secondary reactions are achieved with a K$_2$O content of from 0.1 to 3.0, in particular from 0.7 to 1.8, % of K$_2$O and with a BET surface area of from 30 to 160, preferably from 40 to 90, m$^2$/g.

We have found that, with the same K$_2$O content, decreasing the BET surface area leads to a reduction in amine formation. By optimizing the K$_2$O content and by adapting the BET surface area to the amount of K$_2$O dopant, methanol formation can be reduced to about 1/10, and the amine formation which occurs in the presence of ammonia can be reduced to 1/20.

The BET surface area can be adapted to the potassium content, for example, by modifying the pH during precipitation from 5.5 to 8.0 and modifying the pH of the mixed solution of copper salts, zinc salts and aluminum salts used from $-1.0$ to $+2.5$.

The catalysts are advantageously prepared by precipitating sparingly soluble or insoluble copper hydroxide carbonates together with the corresponding zinc and aluminum compounds while keeping the pH constant during precipitation. The precipitate is filtered off and washed until it is free of foreign ions, eg. nitrate. Doping is advantageously carried out by adding a soluble potassium compound which does not leave behind any foreign ions after drying. The precipitation product thus obtained is dried at from 100° to 450° C., then calcined for from 0.2 to 5 hours at from 250° to 950° C. and then pelletized by adding a pelletizing assistant.

The catalysts generally have a CuO content of from 30 to 50, preferably from 35 to 45, % by weight, a ZnO content of from 5 to 50, preferably from 15 to 45, % by weight, an $Al_2O_3$ content of from 10 to 50, preferably from 13 to 45, % by weight and a $K_2O$ content of from 0.1 to 3.0, in particular from 0.7 to 1.8, % by weight and a BET surface area of from 30 to 160, preferably from 40 to 90, $m^2/g$.

With the same potassium content, a decrease in the BET surface area leads to a substantial reduction in amine formation.

A preferred process for the preparation of the catalyst can be carried out as follows:

a) a copper component, a zinc component and an aluminum component are precipitated together from an aqueous solution which contains a water-soluble copper salt, a water-soluble zinc salt and a water-soluble aluminum salt, using a solution of sodium carbonate or sodium bicarbonate as the precipitating agent, a pH of the suspension of from 5.5 to 8.0, preferably from 6.0 to 7.0, and a temperature of from 30° to 90° C., preferably from 40° to 75° C., being maintained during the precipitation, b) after the end of the precipitation, the precipitated product is aged or conditioned by stirring it in the suspension at from 30° to 90° C., preferably from 40° to 75° C. for from 0 to 10, preferably from 0.1 to 2, hours, if necessary after transfer to the second container, and the pH of the suspension should differ from the pH during precipitation by not more than 0.5, preferably not more than 0.3, unit and, if necessary, is maintained by adding further metal salt solution, c) after the end of the aging process, the precipitate is separated off from the reaction solvent and washed free of foreign ions, so that the sodium content does not exceed 0.15% by weight, based on the mass of the precipitation product which has been calcined for 2 hours at 900° C., d) after the filter cake has been washed, from 0.1 to 3.0% by weight, based on the mass of the precipitated product which has been calcined for 2 hours at 900° C., of $K_2O$ in the form of a soluble potassium compound are added and the mixture is suspended in water so that the solids content of the suspension is from 10 to 30% by weight, e) after the end of the suspension process, the aqueous slurry is spray-dried, the drying temperature preferably being from 150° to 450° C., and is then subjected to a heat treatment by heating the dried product for not less than 0.1 hour, preferably for from 0.2 to 5 hours, at not less than 250° C., preferably from 300° to 950° C., and f) after the heat treatment, the solid is mixed with a pelletizing assistant and is pelletized to give catalyst moldings.

The copper, zinc and aluminum components are co-precipitated from their soluble salts using specific precipitation conditions, specific aging conditions and conditioning conditions and, after the foreign ions have been washed out, a specific amount of an aqueous potassium salt solution is added, the specific heat treatment conditions for the dried and washed precipitated product being used.

Examples of water-soluble copper, zinc and aluminum salts which are used in stage a) are those which do not contain elements such as sulfur and halogens and can furthermore be converted into the oxides at fairly high temperatures, for example nitrates or acetates, the nitrates being particularly preferred.

Preparation of the catalyst starts from an aqueous solution which contains a water-soluble copper(II)salt, a water-soluble zinc salt and water-soluble aluminum salt and has a pH of from $-1.0$ to $+2.5$. The ratio of the copper salt, the zinc salt and the aluminum salt to one another in the aqueous solution depends on the desired ratio of copper to zinc to aluminum in the ready-prepared catalyst. The novel process is particularly advantageously used when the ready-prepared catalyst has a ratio of copper oxide (CuO) to zinc oxide (ZnO) to aluminum oxide ($Al_2O_3$) to potassium oxide ($K_2O$) of 30–50, preferably 35–45, % by weight of CuO to 50–5, preferably 45–15, % by weight of ZnO to 10–50, preferably 13–45, % by weight of $Al_2O_3$ to 0.1–3.0, preferably 0.5–1.8, % by weight of $K_2O$ and a BET surface area of from 30 to 160, preferably from 40 to 90, $m^2/g$.

The concentration of the water-soluble copper salt, of the water-soluble zinc salt and of the water-soluble aluminum salt in the aqueous medium can be varied within a wide range, depending on the type of salts used. In general, it is advantageous if the total concentration of metal salts in the solution is substantially lower than the solubility itself, for example a concentration of less than 2.5 mol/l.

The alkaline precipitating agent for precipitating the copper/zinc/aluminum coprecipitate as an insoluble solid from the aqueous solution of the water-soluble metal salts may be an aqueous solution of sodium carbonate, sodium bicarbonate, ammonium carbonate or ammonium bicarbonate, aqueous sodium carbonate solutions being particularly preferably used. The concentration of the precipitating agent in the aqueous medium can likewise be varied within a wide range. It is in general preferable to use a solution in which the sodium carbonate concentration or the concentration of the alkaline precipitating agent is substantially lower than the solubility itself, for example a concentration of less than 2.1 mol/l.

To carry out the precipitation, it is advantageous initially to take water in the precipitation vessel and to feed the solutions of metal salts and the alkaline precipitating agent, heated to the precipitation temperature, simultaneously into the precipitation vessel in such a way that a pH of from 5.5 to 8.0, preferably from 6.0 to 7.0, is maintained in the suspension during the precipitation. The pH of the suspension or the feed rate of the two streams can advantageously be controlled by means of pH regulation The temperature at which the precipitation reaction is carried out is advantageously from 30° to 90° C., particularly preferably from 40° to 75° C.

The time in which the precipitation reaction is to be carried out can be chosen within a wide range. Advantageously, the precipitation is effected in the course of from 10 minutes to 1 hour, but longer times may also be used if required or shorter times, for example only a few minutes, may also be sufficient.

After the end of the precipitation, the precipitated product is aged or conditioned. For this purpose, it is stirred in the suspension for a further 0.01-10, preferably 0.1-2, hours. This aging can be carried out in the precipitation vessel itself. The precipitated product is advantageously stirred during the aging process.

The temperature at which aging is carried out is in the range in which the precipitation itself is carried out. Aging should therefore be effected at from 30° to 90° C., preferably from 40° to 75° C.

In the course of this aging process, it is also necessary to check the pH of the suspension containing the precipitated product and if necessary to regulate it by adding further metal salt solution so that the pH of the suspension differs from the pH during the precipitation by no more than 0.5, preferably no more than 0.3, unit.

After aging has been carried out, the aged or conditioned precipitation product is separated off from the reaction solvent by conventional measures, such as filtration. The isolated product is then washed thoroughly to remove remaining precipitating agent and other foreign ions, for example nitrate.

An aqueous potassium salt solution, preferably potassium carbonate solution, is then added to the thoroughly washed product. Suspending the thoroughly washed product in water so that the solids content of the resulting suspension is about 10-30, preferably 15-23, % by weight and adding the appropriate amount of aqueous potassium salt solution while stirring the suspension has proven to be a particular advantageous procedure.

The potassium salt used should not introduce any anions which adversely affect the catalytic properties, for example chlorides.

The potassium-containing mixture of the precipitated product is then dried, a temperature of from 100° to about 450° C. being suitable for this purpose.

This is followed by a heat treatment, the dried product being heated for from 0.1 to 20, preferably from 0.2 to 5, hours at from 250° to 950° C., preferably from 300° to 750° C.; a stepwise heat treatment may also be advantageous.

This heat treatment can be carried out in a fixed or agitated bed, for example in a rotary oven or in a fluidized bed. A suitable atmosphere is air, nitrogen or a combustion gas, which must be free of catalyst poisons such as sulfur or halogen compounds.

After the heat treatment has been carried out, the catalyst material is appropriately molded. If necessary, the heat-treated catalyst material can be pulverized prior to molding.

A preferred method for the preparation of novel catalyst moldings is pelletizing, and, if required, it is also possible to carry out molding of the pulverized product, further pulverization of the premolded product and then compression molding to give the desired catalyst moldings.

EXAMPLES

Catalyst Test

For purposes of comparison, each of the catalysts prepared in Examples 1 to 8 in the manner described is first heated with a stream of nitrogen gas at 180° C. in a pressure apparatus. When this temperature is reached, 0.5% by volume of hydrogen is first mixed with the gas stream. After 8 hours, the hydrogen content is then increased from 1.5-2% by volume, the catalyst being treated with this gas mixture for a further 48 hours.

Test Conditions

After the reduction, the catalyst was treated with the following gas mixture:

| a) Activity test | | |
|---|---|---|
| Dry gas composition: | $H_2$ | 60% by volume |
| | CO | 3% by volume |
| | $CO_2$ | 15% by volume |
| | $N_2$ | 22% by volume |
| Steam/dry gas: | | 0.25 v/v |
| GHSV (based on dry gas): | | 10,000 l (S.T.P.) × $l^{-1} \times h^{-1}$ |
| Amount of catalyst: | | 15 ml |
| Operating pressure: | | 30 bar |
| Temperature: | | 180-250° C. |
| b) Selectivity test: | | |
| Dry gas composition: | $H_2$ | 60% by volume |
| | CO | 3% by volume |
| | $CO_2$ | 15% by volume |
| | $N_2$ | 22% by volume |
| | $NH_3$ | 125 mg (S.T.P.) of dry gas |
| Steam/dry gas: | | 0.4 v/v |
| GHSV (based on dry gas): | | 3000 l (S.T.P.) × $l^{-1} \times h^{-1}$ |
| Amount of catalyst: | | 50 ml |
| Operating pressure: | | 30 bar |
| Temperature: | | 250° C. |

The conversion, based on the thermodynamic equilibrium value (=100%), at 195° C. is stated as a measure of the activity.

$$\% \; U \frac{CO_E - CO_R}{CO_E - CO_{GGW}} \times 100$$

$CO_E$ = CO concentration in inlet gas
$CO_R$ = Residual CO concentration
$CO_{GGW}$ = Equilibrium CO concentration The extent of formation of byproducts over the catalyst is determined as follows: after operation for 24 hours at an oil bath temperature of 220° C., a sample of the aqueous condensate is taken and is analysed by gas chromatography.

COMPARATIVE EXAMPLE A

Solution I 2,430 g of $Cu(NO_3)_2.3H_2O$ 1,462 g of $Zn(NO_3)_2.6H_2O$ 5,887 g of $Al(NO_3)_3.9H_2O$ are dissolved in 20.3 l of water. The pH of the solution is 1.5.

Solution II 4,000 g of technical grade sodium carbonate are dissolved in 1 l of water.

The solutions are heated separately to 50° C. 5 l of water at 50° C. are initially taken in the precipitation vessel. The two solutions are combined in the precipitation vessel, while stirring, in such a way that the pH is 6.0 during the precipitation. The precipitate is aged for a further 2 hours in the mother liquor while stirring, if necessary a further solution I being added to keep the pH constant. It is then filtered off and washed free of foreign ions with water. The washed precipitate is spray-dried at 100°-200° C., calcined for 4 hours at 350° C. and, after the addition of 2% of graphite, compressed to give pellets.

The catalyst prepared in this manner contains 40% by weight of CuO, 20% by weight of ZnO and 40% by weight of $Al_2O_3$ and, after pelletization, has a BET surface area of 110 $m^2/g$.

COMPARATIVE EXAMPLE B

The process of Example 1 is repeated, except that the solution of 138 g of $K_2CO_3$ in distilled water is added to the washed precipitate prior to spray drying. The catalyst thus prepared has a BET surface area of 86 $m^2/g$.

COMPARATIVE EXAMPLE C 26 parts of boehmite powder (AlOOH) are suspended in 400 parts of water. An aqueous solution of zinc nitrate and copper nitrate, which contains 32 parts of Cu and 32 parts of Zn, and a 20% strength sodium carbonate solution are run in simultaneously, and the pH is kept at 6.5 by pH regulation. The temperature of the precipitation solution is kept at 50° C. After the end of the precipitation, the product is filtered off, washed and dried at 200° C., and 100 g of the dried powder are made into a slurry with 100 ml of an aqueous $K_2CO_3$ solution. This solution contains 0.76 g of $K_2CO_3$. The paste formed is dried, mixed with 2% by weight of graphite and then compressed to give pellets of 3 mm diameter and 3 mm height; the BET surface area is 105 $m^2/g$.

COMPARATIVE EXAMPLE D

The process of Example C is repeated, except that 100 g of the dried powder are made into a slurry with an aqueous solution which contains 3.0 g of $K_2CO_3$; the BET surface area is 108 $m^2/g$.

Examples according to the invention

EXAMPLE 1

The procedure is similar to that described in Comparative Example A, the filter cake being washed and then an appropriate amount of $K_2CO_3$ being added to part of the filter cake so that the content of $K_2O$ is 1.50% by weight, based on a sample calcined for 1 hour at 900° C. The procedure is then carried out as in Comparative Example A. After it has been pelletized, this catalyst has a BET surface area of 119 $m^2/g$.

EXAMPLE 2

The procedure described in Comparative Example A is followed, the pH of the solution I being −0.7 (addition of $HNO_3$). The precipitation is carried out at a pH of 6.5. The pH during subsequent stirring is likewise kept at 6.5. $K_2CO_3$ is added to part of the filter cake so that the $K_2O$ content is 1.46% by weight, based on a sample calcined for 1 hour at 900° C.; the BET surface area is 82 $m^2/g$.

EXAMPLE 3

The procedure described in Comparative Example A is followed, except that precipitation and subsequent stirring are carried out at pH 6.7. Part of the filter cake obtained in this precipitation is doped with $K_2CO_3$ so that the content of $K_2O$ is 1.51% by weight. Further processing is carried out as in Comparative Example A. After it has been pelletized, the catalyst has a BET surface area of 43 $m^2/g$.

EXAMPLE 4

As in Example 1 but with the addition of 1.66% by weight of $K_2O$. BET surface area = 111 $m^2/g$.

COMPARATIVE EXAMPLE 5

The procedure described in Example 2 is followed, the addition of $K_2CO_3$ being dispensed with. After it has been pelletized, this catalyst has a BET surface area of 69 $m^2/g$.

COMPARATIVE EXAMPLE 6

The procedure described in Example 3 is followed, except that $K_2CO_3$ is not added. The BET surface area is 43 $m^2/g$.

EXAMPLE 7

The procedure described in Example 2 is followed, $K_2CO_3$ being added to the filter cake so that the $K_2O$ content is 1.18% by weight; the BET surface area is 85 $m^2/g$.

EXAMPLE 8

The procedure is similar to that in Example 3, except that the filter cake is doped with $K_2CO_3$ so that the $K_2O$ content of the catalyst is 0.90% by weight; the BET surface area is 46 $m^2/g$.

Results of the activity and selectivity tests

| Example | BET [$m^2/g$] | $K_2O$ [%] | Methanol [%] | Amines [ppm] | Conversion [%] |
| --- | --- | --- | --- | --- | --- |
| Comparative Example A | 110 | <0.01 | 0.63 | 448 | 96 |
| Comparative Example B | 86 | 4.7 | 0.008 | <1 | 69 |
| Comparative Example C | 105 | 0.5 | 0.15 | 18 | 90 |
| Comparative Example D | 108 | 2.0 | 0.09 | <1 | 62 |
| Example 1 | 119 | 1.50 | 0.50 | 71 | 96 |
| Example 2 | 82 | 1.46 | 0.10 | 4 | 97 |
| Example 3 | 43 | 1.51 | 0.12 | 4 | 97 |
| Example 4 | 111 | 1.66 | 0.12 | 21 | 98 |
| Example 5 | 69 | <0.01 | 0.61 | 270 | 96 |
| Example 6 | 43 | <0.01 | 0.58 | 157 | 94 |
| Example 7 | 85 | 1.18 | 0.53 | 72 | 95 |
| Example 8 | 46 | 0.90 | 0.56 | 56 | 96 |

The specific surface area is determined by the BET method. [S. J. Gregg, K. S. W. Sing, "Adsorption, Surface Area and Porosity", Academic Press, New York 1982]

When the comparative catalyst having a BET surface area of 110 $m^2/g$ is used, 0.63% by weight of methanol and 448 ppm of amines are formed.

Decreasing the surface area (Examples 5 and 6) substantially reduces amine formation (270 and 157 ppm, respectively).

Furthermore, the formation of amine and methanol is substantially reduced by doping with $K_2O$ (Comparative Example B and Examples 1 and 4).

It is found that, in order to reduce amine formation, a comparatively smaller amount of $K_2O$ is required with a smaller surface area than with a larger surface area (cf. Examples 1, 7 and 8).

If the amount of potassium dopant is kept constant and the BET surface area is reduced, amine and methanol formation decreases sharply (Examples 1, 2 and 3).

It is advisable as far as possible to keep doping with $K_2O$ to a minimum, since a high $K_2O$ content has an adverse effect on the activity (cf. Comparative Examples B and D).

We claim:

1. A process for the preparation of a copper, aluminum, zinc and potassium containing catalyst for shift conversions which comprises:
   (a) coprecipitating in aqueous solution, water-soluble salts of copper, zinc and aluminum at a constant pH value of from 5.5 to 8.0 and at a constant temperature of from 30° and 90° to form sparingly water-soluble or water-insoluble compounds of copper, zinc and aluminum;
   (b) aging the precipitate while maintaining the same pH value as that of the precipitation step during the aging within a tolerance range of ±0.5 and,
   (c) separating and washing the aged precipitate;
   (d) adding water-soluble potassium compound, in an amount corresponding to 0.1 to 3.0% by weight of $K_2O$ based on the mass of the precipitate, and suspending the mixture;
   (e) drying and heat-treating the resulting mixture to obtain a catalyst having a BET surface area in the range of from 30 to 160 $m^2/g$.

2. A process as defined in claim 1, wherein the catalyst contains copper, zinc and aluminum in amounts corresponding to from 30 to 50% by weight of CuO, from 5 to 45% by weight of ZnO and from 5 to 50% by weight of $Al_2O_3$, based on the calcined catalyst.

3. A process as defined in claim 1, wherein the aging step (b) is carried out by stirring the aqueous suspension of the precipitate.

4. A process as defined in claim 1, wherein the suspended mixture of step (d) has a solids content of 10 30% by weight.

5. A process as defined in claim 1, wherein in process step (e) the mixture is spray-dried at a temperature of from 150° to 450° C.

6. A process as defined in claim 1, wherein the resulting dried catalyst is pelletized.

* * * * *

UNITED STATES PATENT AND TRADEMARK OFFICE
CERTIFICATE OF CORRECTION

PATENT NO.  : 5,128,307

DATED       : July 7, 1992

INVENTOR(S) : Herbert WANJEK, et al.

It is certified that error appears in the above-identified patent and that said Letters Patent is hereby corrected as shown below:

Claim 1, column 9, line 13, delete "sparingly water soluble or"

Signed and Sealed this

Twenty-first Day of September, 1993

Attest:

BRUCE LEHMAN

*Attesting Officer*   *Commissioner of Patents and Trademarks*